| United States Patent Office | 2,718,470 |
|---|---|
| | Patented Sept. 20, 1955 |

2,718,470

PROCESS FOR FOOD PRESERVATION

Vern F. Kaufman, Lafayette, Myron J. Powers, San Francisco, and William F. Talburt, Berkeley, Calif., assignors to the United States of America as represented by the Secretary of Agriculture No Drawing. Application September 11, 1951,
Serial No. 246,146

7 Claims. (Cl. 99—186)

(Granted under Title 35, U. S. Code (1952), sec. 266)

The invention herein described may be manufactured and used by or for the Government of the United States of America for governmental purposes throughout the world without the payment to us of any royalty thereon.

This invention relates to and has as its prime object the provision of novel processes for preserving solid, perishable foodstuffs. Further objects and advantages of this invention will be obvious from the description herein.

Briefly described, our novel technique comprises partially dehydrating a solid, perishable foodstuff to a moisture content from about 35% to about 70%, said foodstuff having an initial moisture content relatively high to that of the partially dehydrated product, and then canning the partially dehydrated foodstuff at the aforesaid moisture level, that is sealing the partially dehydrated product in a suitable container, with the application of heat at sterilization temperatures to insure sterilization of the foodstuff. If desired, the partially dehydrated foodstuff may be compressed into the containers to obtain more nutritive material per volume of container. For the purposes of this specification, the expression "partial dehydration" means the removal of water from the solid foodstuff to a moisture level substantially above the moisture level required for preservation by drying alone.

By proceeding in accordance with this invention many distinctive advantages are gained. These advantages can best be demonstrated by a comparison of the technique and products of this invention with the prior art procedures of conventional dehydration and canning, thus:

Comparison with conventional dehydration

It is well known that many foodstuffs can be preserved by dehydration—in such case the moisture content of the foodstuff must be virtually completely eliminated. Thus the usual dehydrated vegetables of commerce contain at most about 3 to 10% moisture, and in some cases considerably less. Products of this type are generally only suitable for purposes where the savings in shipping and storage costs outweigh the factor of quality, as for example, in military or other emergency rations. The point is that dehydrated foods do not taste like the fresh materials—the dehydration to the necessarily low moisture levels causes deleterious changes in color and flavor of the foodstuff. In contrast, the partially dehydrated and canned products of the present invention retain to a great extent the natural color and flavor of the fresh foodstuff and in these essential organoleptic qualities are far superior to conventional dehydrated products. Thus by the use of partial dehydration we avoid serious damage to the foodstuff tissues and hence produce products which are comparable in color and flavor with fresh or fresh-frozen foods.

Another significant factor to be considered is rehydration. In order to utilize conventional dehydrated foodstuffs it is essential to first rehydrate them as they are hard and inedible in their dehydrated state. This rehydration, or reconstitution as it often is called, requires that the product be soaked in water for several hours or cooked in boiling water for a half-hour or more. This rehydration is not only time consuming but must be carefully carried out to get a palatable dish. In contrast, the products in accordance with this invention can in many cases be consumed directly because they are tender and directly edible. If rehydration is desirable or necessary as with vegetables processed in accordance with this invention then the rehydration merely requires cooking in water for a few minutes or soaking in cold water for less than an hour.

A further item worthy of consideration lies in matters of costs of operation and plant construction. Dehydration to the levels required for preservation by dehydration alone involves a time-consuming and expensive operation. The removal of the last portions of moisture from the product is particularly difficult and time consuming. In contrast, the partial dehydration in accordance with this invention involves removal of only part of the natural moisture content of the foodstuff—the removal of moisture at this level is a relatively rapid and inexpensive procedure as compared to dehydration to low moisture levels. Thus the partial dehydration in accordance with this invention requires ¼ to ½₀ the time required for dehydration to levels required for preservation by dehydration alone. This shorter time not only represents economies in plant construction and operation costs but greatly reduces the opportunity for flavor and color destruction. The higher moisture content helps to reduce piece temperature and minimize heat damage during dehydration.

The question of compressibility is another item worthy of discussion. When foodstuffs are dehydrated to the low moisture levels required for preservation by dehydration alone they tend to become brittle. When it is attempted to compress these products into a container to reduce shipping, storage, and container costs, it is found that much breakage occurs with the result that the products become even less palatable than they would otherwise be. In contrast, the partially dehydrated products of this invention may be subject to compression without damage because at this stage the products are flexible. Thus the partially dehydrated products have a suitable moisture content for compression so that a high bulk-density pack can be obtained. Thus their moisture content is low enough to prevent exudation of natural juices on application of the pressure and yet their moisture content is high enough so that they are flexible and will assume the shape of any container into which they are pressed. Further, only relatively low pressures are required to achieve compression in contrast to high pressures required with conventionally dehydrated products. Ability to withstand compression without damage is of course a very desirable attribute as it permits one to store large amounts of edible material in a small space and also results in savings in shipping costs and container costs.

Another point to be made concerns the stability of the final product during storage. Essentially all foodstuffs contain small though significant amounts of fat and other oxidizable constituents and rancidification upon storage is always a possibility to be considered. In the case of completely dehydrated foodstuffs, for example dehydrated potatoes, development of rancidity is a definite problem as it is greatly accelerated in products of very low moisture content. However, in accordance with this invention the moisture retained in the product is so high that rancidification is not a problem as it does not take place at all.

Comparison with conventional canning

In conventional canning practice, the foodstuff is canned at its natural moisture level or more generally with additional water supplied as syrup or brine. This means, of course, that a large part of the contents of each can is simply water. It must be realized that most fruits and vegetables in their fresh condition contain anywhere from 80 to 95% water and hence even if the products are canned without added water, the amount of nutritive material in each can will only be 5 to 20% of the net weight. In contrast, by the use of the present invention, the foodstuffs are first partially dehydrated, then canned without addition of any moisture. As a result, each can will contain a relatively high proportion of nutritive material, that is 30% to 65% of the net weight. This means that important advantages are secured in storage and shipping charges because of the elimination of a large part of the natural moisture content. Further, savings of critical packaging materials and reduction in costs for packaging and distribution are likewise effected. The savings in packaging materials is especially significant in periods of national emergency and in the long range problems of providing an adequate, high quality food supply for maintaining our present living standards. Containers of tin-coated steel have for many years been the means of preserving vast quantities of foodstuffs that are now considered essential in the diet of the American people. Much of the tin required for these containers comes from foreign sources and the supply is subject to interruption at any time. It is therefore very advantageous to this country to have a means of conserving tin and other essentials for food packaging.

Another point to be made is that in conventional canning practice, the foodstuffs are generally packed in syrups for fruits or brine for vegetables. Even if no moisture is deliberately added, free moisture will be formed in the cans during the retorting operation. During storage of the canned products some of the nutrients tend to diffuse into this free liquid, particularly the water-soluble vitamins. However, the average consumer has no available use for this liquid and it is frequently discarded resulting in a waste of valuable nutrients. In accordance with this invention, the cans do not contain any free liquid. None is added during canning and none exudes from the foodstuff during processing. This means that when the can is opened it is found to contain solely the solid pieces of foodstuff and hence the entire contents of the can can be consumed with no waste whatever.

In applying the present invention in practice the following procedure is used. The selected solid foodstuff is first subjected to the preparative steps common to all food processing operations, i. e., washing, peeling, trimming, removal of seeds or cores, comminution into pieces suitable for placing in cans, and so forth. Thus in operating on apples, these products would be peeled, cored, trimmed, washed, and cut into slices, say eighths to sixteenths. The particular preliminary treatment will in any case depend on the type of foodstuff being treated. Thus peeling and slicing would be required for apples, pears, peaches, potatoes, tomatoes, beets, and so forth. Small fruit such as berries or cherries would only require washing or in addition pitting in the latter case. Leafy vegetables such as cabbage and spinach would require washing followed by shredding into conventional-sized pieces.

In many cases it is desirable to subject the foodstuff pieces to treatment to inactivate their enzyme content so that they will not brown during the subsequent partial dehydration operation. For this purpose the foodstuff may be subjected to blanching as by immersion in boiling water or preferably by treatment with steam. In addition to blanching, or instead of blanching, the foodstuff may be sulphited or treated with other agents which retard browning (ascorbic acid for example). Thus the product may be subjected to sprays of aqueous solution containing sulphur dioxide, sodium sulphite, sodium bisulphite, or ascorbic acid. In the case of some products, apples for instance, browning may be additionally retarded by keeping the products immersed in warm (about 120° F.) water or brine prior to blanching or sulphiting to remove oxygen from the tissues, this oxygen removal being accomplished by respiration of the living tissue.

The foodstuff pieces are then subjected to the partial dehydration. This is preferably conducted in the usual types of apparatus which provide a draft of heated air over the foodstuff pieces to cause rapid evaporation of moisture. Thus forced-air dehydrators of the tunnel, tray, continuous belt, or rotary kiln type may be employed. As in conventional dehydration practice, the temperature of the air should be about 140° F. to about 225° F. This dehydration is continued until the food product has lost at least 50% of its weight by elimination of moisture which means that more than half of the moisture content of the fresh product is removed. Although we prefer to conduct the partial dehydration to the extent that a 50% weight reduction is obtained, a higher weight reduction may be obtained, up to about 75% with some products. In any case the moisture content of the partially dehydrated products will vary depending on the original moisture content thereof. In most cases the partially dehydrated product will have a moisture content from about 35% to about 70%. The moisture level within this range to be employed in any particular case will depend upon the nature of the foodstuff in question. It is to be emphasized that partial dehydration to any level within this range means that a large percentage of the original moisture content has been removed while avoiding the flavor-deteriorative and uneconomical aspects of usual dehydration. Apples, for example, in their fresh condition contain about 85% moisture and if 100 lbs. of apples are reduced to a weight of 50 lbs. by partial dehydration it means that 50 lbs. of the original 85 lbs. of water originally present is removed. The partially dehydrated apples now at a moisture level of 70%, are amenable to the further steps of canning or compressing and canning yet in this partial dehydration have not developed any appreciable off-flavor as they would in conventional low-moisture level dehydration and further, this partial dehydration has not involved the long and expensive procedure required for such complete dehydration. Concerning the technique of dehydration of apples, it has been observed that if the temperature in the dehydrator is kept at such a level that the temperature of the apple pieces is maintained at 110°–120° F., the oxygen naturally present in the tissues is completely consumed by respiration. Removal of oxygen is desirable to maintain the natural color of the product on subsequent storage.

The partially dehydrated foodstuff pieces are then ready for canning. This step can be accomplished in several ways. Thus the product may be directly packed in cans, the cans sealed under vacuum and then heat processed to sterilize the contents. Preferably, the partially dehydrated products are removed from the dehydrator and without any opportunity for cooling are sterilized by contact with live steam to raise their temperature to about 200–212° F., this temperature being maintained for a few minutes, about 1–3 minutes. The hot products are then quickly packed into suitable containers, which are sealed under vacuum. The sealed containers are then contacted with steam or boiling water for about 10 minutes to sterilize the formerly cold, unsterile container. The heating with steam referred to above in the preferred mode of treatment does not materially affect the moisture content of the foodstuff as the pieces are hot from the dehydration and at most pick up 1 to 3% of moisture from the steaming treatment. If it is desired to increase the amount of edible material in the cans, they may be filled with the hot foodstuff under compression, as by the use of a piston-actuated filler. After heat processing, the cans are cooled with cold water to about body temperature then stacked to permit air drying of the containers and further cooling. It is evident that if the heat-processed foodstuff is packed into sterile cans under aseptic conditions, the step of heat processing after sealing can be eliminated.

In the preferred modification of our process, the partially dehydrated foodstuff is packed into the cans without adding any other material so that the cans contain solely the partially dehydrated foodstuff pieces. However, if desired one may add various materials to the cans for accomplishing certain objectives. Thus aqueous solutions containing sugar, salt or other flavoring agents may be added. Fruit juice concentrates may be added to enhance the flavor of the product. Solutions of vitamins or other nutritive materials may be added. A small amount of water may be added to the cans to form steam during the heat processing and thus assist in sterilizing the contents of the can. It is evident that when any aqueous liquid is added, the extent of dehydration should be initially raised to compensate for the added water so that the pack in such event will still contain about 35% to about 70% water.

The following examples demonstrate the invention in greater detail. These examples are furnished only by way of illustration and not limitation.

*Example I*

A lot of fresh French prunes was washed in water then subjected to dehydration at 180° F. dry bulb, 110° F. wet bulb, for 5 hours by which time the fruit had lost 50% of its weight by elimination of moisture (moisture content at this point, approximately 52%). The partially dehydrated fruit was removed from the dehydrator and directly subjected to live steam to heat it to 212° F., this temperature being maintained for 12 minutes, the longer time being for skin tenderization. The hot fruit was immediately transferred into #2 sanitary cans and sealed under vacuum of about 10" Hg. The sealed cans were then heat-processed at 212° F. for 10 minutes.

The canned products, after storage for about a month at room temperature, were opened, examined, and tasted. The prunes were found to be plump with dark-purple skins and yellow flesh. The fruit pieces retained their individuality with no mushing. The fruit was tender and could be eaten directly; it had a natural taste and aroma and was far superior in these attributes to commercial dried prunes.

*Example II*

A lot of fresh Blenheim apricots was washed, halved, pitted and blanched 3 minutes at 212° F., the fruit being placed one layer deep on trays, the cups upward.

The blanched apricots were partially dehydrated at 220° F. dry bulb, 110° F. wet bulb for one hour, by which time they had lost 50% of their initial weight by elimination of moisture. The moisture content of the partially dehydrated apricots was approximately 70%.

The partially dehydrated apricots were removed from the dehydrator and directly subjected to live steam to heat them to 212° F., this temperature being maintained for about 90 seconds.

The hot fruit was immediately filled into #2 sanitary cans and sealed under vacuum of about 10" Hg. The sealed cans were then heat-processed at 212° F. for 10 minutes.

After storage for about a month at room temperature, the cans of apricots were opened, examined and tasted. It was found that the fruit was plump with pale-orange skins and flesh. The apricot pieces retained their individuality with no mushing or other disintegration. The fruit was tender and could be eaten directly; it had a natural taste and aroma and was free from the characteristic flavor of commerial dried apricots.

*Example III*

A lot of Newton apples was peeled, cored, and sliced into radial twelfths.

The apple slices were immersed in 3% aqueous sodium chloride solution at 110° F. for 45 minutes, then rinsed in plain water for ¼ minute. The slices were then dipped in a 0.05% sulphur dioxide solution for 10 seconds.

The sulphited slices were dehydrated on trays loaded 1½ lbs. per sq. ft., at 180° F. dry bulb, 90° F. wet bulb for 35 minutes by which time the fruit had lost 50% of its initial weight due to elimination of moisture. The moisture content of the partially dehydrated fruit was approximately 70%.

The partially dehydrated apple slices were removed from the dehydrator and directly subjected to live steam to heat them to about 205° F., this temperature being maintained for about 2 minutes.

The hot fruit was immediately packed into #2 sanitary cans and sealed under vacuum of 15" Hg. The sealed cans were then heat-processed at 212° F. for 10 minutes.

The canned products were stored about a month at room temperature, the products were then examined and tasted. It was found that the apple pieces were plump with no signs of wrinkling, and of a bright color. The pieces were opaque and similar in appearance to slices from fresh apples in contrast to the translucent, water-logged appearance of ordinary canned apple slices. Further, the pieces retained their individuality with no mushing. The fruit was tender and could be eaten directly; it had a natural flavor and aroma and was far superior to both conventional dried apples and conventional canned apples.

Having thus described our invention, we claim:

1. A process comprising partially dehydrating a solid, perishable foodstuff of relatively high moisture content to a moisture content from about 35% to about 70%, then canning the partially dehydrated foodstuff at the aforesaid moisture level with the application of heat at sterilization temperatures to insure sterilization of the foodstuff.

2. A process comprising partially dehydrating a solid, perishable fruit of relatively high moisture content to a moisture content from about 35% to about 70%, then canning the partially dehydrated fruit at the aforesaid moisture level with the application of heat at sterilization temperatures to insure sterilization of the fruit.

3. A process comprising partially dehydrating a solid, perishable foodstuff of relatively high moisture content to a moisture content from about 35% to about 70%, filling the partially dehydrated foodstuff into containers, sealing the containers, and subjecting the containers of partially dehydrated foodstuff to a heat-processing operation at sterilization temperatures to insure sterilization of the foodstuff.

4. A process comprising partially dehydrating a solid, perishable foodstuff of relatively high moisture content to a moisture content from about 35% to about 70%, compressing the partially dehydrated foodstuff into containers, sealing the containers, and subjecting the sealed containers of partially dehydrated foodstuff to a heat-processing operation at sterilization temperatures to insure sterilization of the foodstuff.

5. A process comprising partially dehydrating a solid, perishable fruit of relatively high moisture content to a moisture content from about 35% to about 70%, filling the partially dehydrated fruit into containers, sealing the containers, and subjecting the sealed containers of partially dehydrated fruit to a heat-processing operation at sterilization temperatures to insure sterilization of the fruit.

6. A process comprising partially dehydrating a solid, perishable foodstuff of relatively high moisture content to a moisture content from about 35% to about 70%, heating the partially dehydrated foodstuff, filling the partially dehydrated foodstuff while still hot into containers, sealing the containers, and subjecting the containers of partially dehydrated foodstuff to a heat-processing operation at sterilization temperatures to insure sterilization of the foodstuff.

7. A process comprising partially dehydrating a solid, perishable fruit of relatively high moisture content to a moisture content from about 35% to about 70%, heating the partially dehydrated fruit, filling the partially dehydrated fruit while still hot into containers, sealing the containers and subjecting the containers of partially dehydrated fruit to a heat-processing operation at sterilization temperatures to insure sterilization of the fruit.

References Cited in the file of this patent

UNITED STATES PATENTS

| | | |
|---|---|---|
| 2,231,791 | Bensel | Feb. 11, 1941 |
| 2,565,942 | Barsky et al. | Aug. 28, 1951 |

OTHER REFERENCES

"Commercial Fruit and Vegetable Products," by William Vere Cruess, 2nd edition, published 1938 by McGraw-Hill Book Co. Inc., New York, N. Y., pages 25, 154, 175, 449, 452, 490.